United States Patent
Manchester

(10) Patent No.: US 7,441,988 B2
(45) Date of Patent: Oct. 28, 2008

(54) SUBMERGED POWER GENERATING APPARATUS

(75) Inventor: Jonathan Ralph Manchester, Rowlands Gill (GB)

(73) Assignee: Soil Machine Dynamics Limited (GB)

( * ) Notice: Subject to any disclaimer, the term of this patent is extended or adjusted under 35 U.S.C. 154(b) by 0 days.

(21) Appl. No.: 10/548,791

(22) PCT Filed: Feb. 26, 2004

(86) PCT No.: PCT/GB2004/000766

§ 371 (c)(1), (2), (4) Date: May 5, 2006

(87) PCT Pub. No.: WO2004/083629

PCT Pub. Date: Sep. 30, 2004

(65) Prior Publication Data

US 2006/0222461 A1    Oct. 5, 2006

(30) Foreign Application Priority Data

Mar. 18, 2003 (GB) .................................. 0306093.6

(51) Int. Cl.
*E02B 9/00* (2006.01)
*F03B 13/10* (2006.01)

(52) U.S. Cl. .......................................... 405/75; 290/54
(58) Field of Classification Search ................... 405/75, 405/76; 290/52–55; 415/7, 8
See application file for complete search history.

(56) References Cited

U.S. PATENT DOCUMENTS

| | | | | |
|---|---|---|---|---|
| 4,301,377 A | * | 11/1981 | Rydz | 290/43 |
| 4,850,190 A | * | 7/1989 | Pitts | 60/398 |
| 4,864,152 A | * | 9/1989 | Pedersen | 290/53 |
| 5,136,174 A | * | 8/1992 | Simoni | 290/54 |
| 5,947,678 A | * | 9/1999 | Bergstein | 415/3.1 |
| 6,091,161 A | * | 7/2000 | Dehlsen et al. | 290/43 |
| 6,114,773 A | * | 9/2000 | Kouris | 290/52 |
| 6,472,768 B1 | * | 10/2002 | Salls | 290/54 |
| 6,531,788 B2 | * | 3/2003 | Robson | 290/43 |
| 6,568,878 B2 | * | 5/2003 | Woodall et al. | 405/25 |
| 6,982,498 B2 | * | 1/2006 | Tharp | 290/54 |
| 7,105,942 B2 | * | 9/2006 | Henriksen | 290/55 |
| 2005/0206168 A1 | * | 9/2005 | Murakami et al. | 290/55 |
| 2006/0127210 A1 | * | 6/2006 | Buttler | 415/7 |
| 2006/0222461 A1 | * | 10/2006 | Manchester | 405/75 |

* cited by examiner

*Primary Examiner*—Tara L. Mayo
(74) *Attorney, Agent, or Firm*—Jack Schwartz & Associates, PLLC

(57) ABSTRACT

An undersea power generation apparatus (1) includes two turbines (3) mounted side by side at either side of a support strut of hydrofoil-shaped cross section, each turbine (3) having a set of turbine blades which counter rotate so as to cancel out the respective torque produced by each turbine. The apparatus (1) is pivotally interconnected at point (9) to a pair of mooring cables (7), which are releasably moored to the seabed (6). The turbines (3) are positively buoyant such that in zero current they point vertically upwards as denoted by (8). When the current flows in the direction shown by arrow A, the drag forces on turbines (3) and support strut cause the apparatus (1) to pivot about point (9) and pitch over into condition denoted by (10) and shown in broken lines.

19 Claims, 4 Drawing Sheets

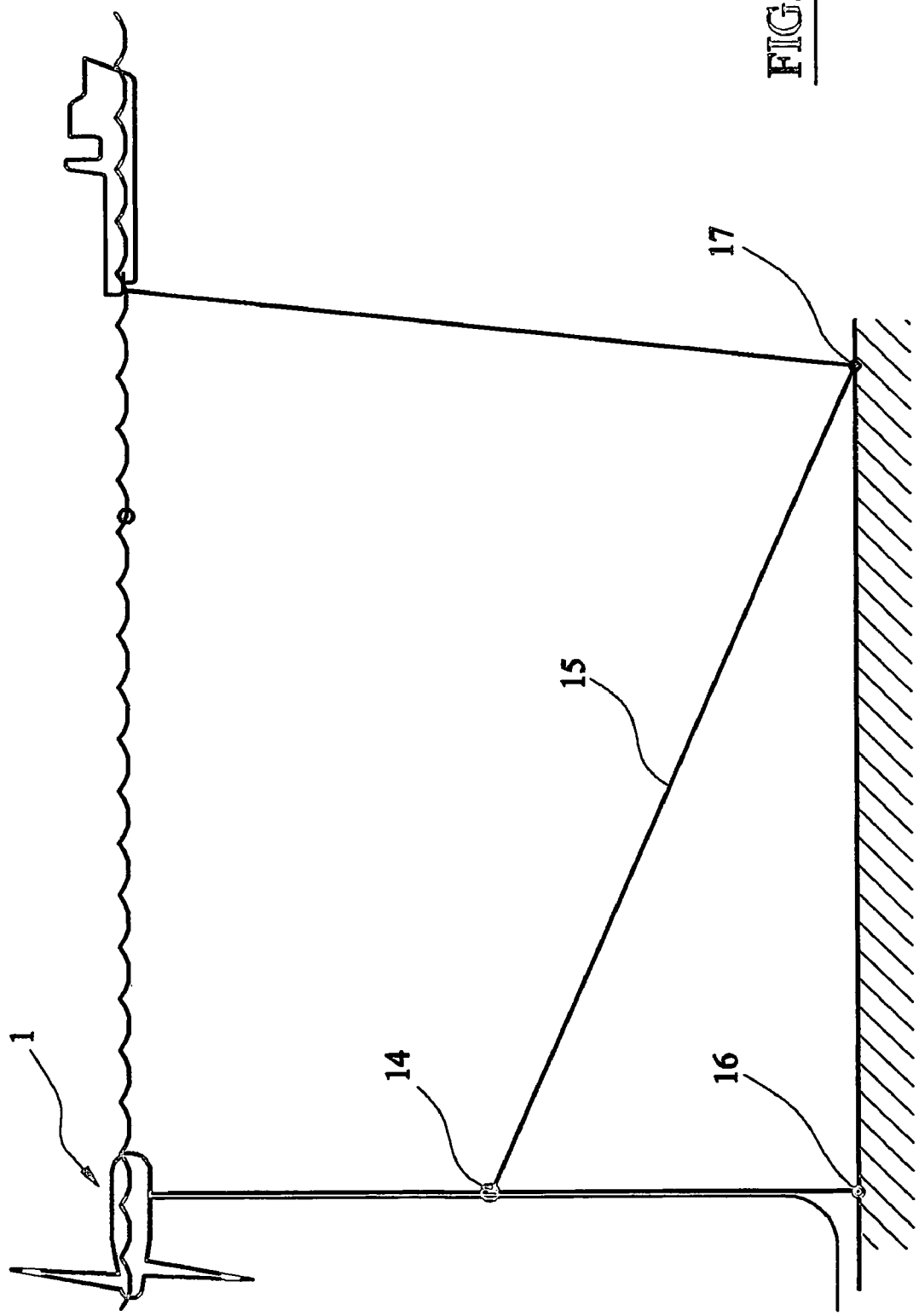

US 7,441,988 B2

SUBMERGED POWER GENERATING APPARATUS

BACKGROUND OF THE INVENTION

1. Field of the Invention

The present invention relates to apparatus for generating electrical power from water flow, and relates particularly, but not exclusively to generating electricity from tidal flow.

2. Description of Related Art

In order to make sources of renewable energy economically viable, the costs of electricity production from renewable energy sources have to be minimised. In particular, in the case of tidal power due to the generally hazardous and aggressive nature of the sea, the costs of production and maintenance of tidal power generation devices are high.

Prior art tidal power generation devices rely on a turbine to align itself with tidal current by rotating around a vertical axis through a mooring point, or by rotating a pillar or other such fixing device. This type of device suffers from the drawback that as a result of the turbine's strong tendency to align itself with the direction of water flow such that the turbine blades rotate about a generally horizontal axis relative to the turbine body (in order to maximise the efficiency of the turbine), movement of the turbine from a forward facing to a rearward facing orientation tends to occur about a generally vertical axis. As a result, repeated rotation of the turbine as a result of changes in the direction of current flow leads to twisting of the mooring cable or any power cable attached to the turbine, which is turn means that complicated and expensive slip ring arrangements become necessary to avoid twisting of the cables, or operation of the power generation apparatus must be halted to enable twisting of the cables to be reversed.

SUMMARY OF THE INVENTION

Preferred embodiments of the present invention seek to overcome the above disadvantages of the prior art.

According to the present invention there is provided an apparatus for generating electrical power from water flow, the apparatus comprising:

at least one positively buoyant turbine comprising a respective first part and a respective second part adapted to be rotated about a respective axis by means of water flow relative to said first part, wherein the centre of mass and the centre of buoyancy of the or each said turbine are spaced apart from each other such that the axis of the of each said turbine is adapted to adopt a substantially vertical orientation in non-flowing water; and at least one mooring cable for mooring the or each said turbine in a submerged condition to the floor of a body of water.

By providing a positively buoyant turbine moored in a submerged condition to the sea or river bed, due to the opposing forces of buoyancy and the mooring force provided by the cables, the mooring cables are always in a taut condition. By arranging the centre of mass and the centre of buoyancy of the or each turbine to be spaced apart from each other such that the axis of the of each turbine is adapted to adopt a substantially vertical orientation in non-flowing water, this provides the advantage that the turbine can move from a forward facing direction (representing incoming tidal flow) to a rearward facing direction (representing outgoing tidal flow) with its axis remaining in a generally vertical plane. This in turn provides the advantage of minimising the tendency of cables connected to the turbines to twist, as a result of which there is no need for rotating parts or any form of drive to align the turbine with the current. Furthermore, this provides the advantage that a reaction force is always present to enable water flow to rotate the turbine blades. Moreover, as the turbine is moored under the water surface, this provides the advantage of eliminating damage caused by surface waves and weather.

In a preferred embodiment, at least one said turbine may be connected by means of a plurality of said mooring cables to the floor of the body of water.

This provides the advantage of further minimising twisting of cables connected to the turbine.

The apparatus may further comprise at least one spacer member separating a pair of said mooring cables.

This provides the advantage of minimising the extent to which the plurality of cables twist around each other.

In a preferred embodiment, a plurality of said turbines may be rigidly connected to each other.

The second parts of at least one pair of said interconnected turbines may be adapted to rotate in opposite senses to each other.

This provides the advantage of minimising the resultant torque produced by rotation of the respective turbine blades.

At least one said turbine may further comprise an electrical generator.

The apparatus may further comprise at least one electrical cable connected to a said turbine and adapted to remove generated electricity to a location remote from said turbine.

At least one said mooring cable may be rigid.

This provides the advantage of increasing the strength of the apparatus.

Preferred embodiments of the invention will now be described, by way of example only and not in any limitative sense, With reference to the accompanying drawings in which:

BRIEF DESCRIPTION OF THE DRAWINGS

FIGS. 5a to 5c show a retrieval process for the apparatus of FIG. 3.

DETAILED DESCRIPTION OF THE INVENTION

Figure 2:
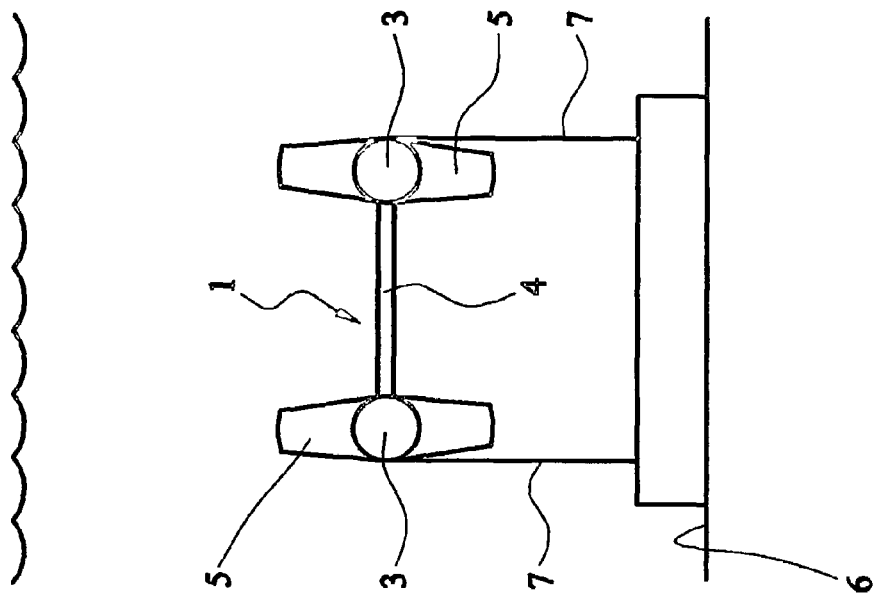
FIG. 2 is a front view of the apparatus of FIG. 1.
Figure 1:
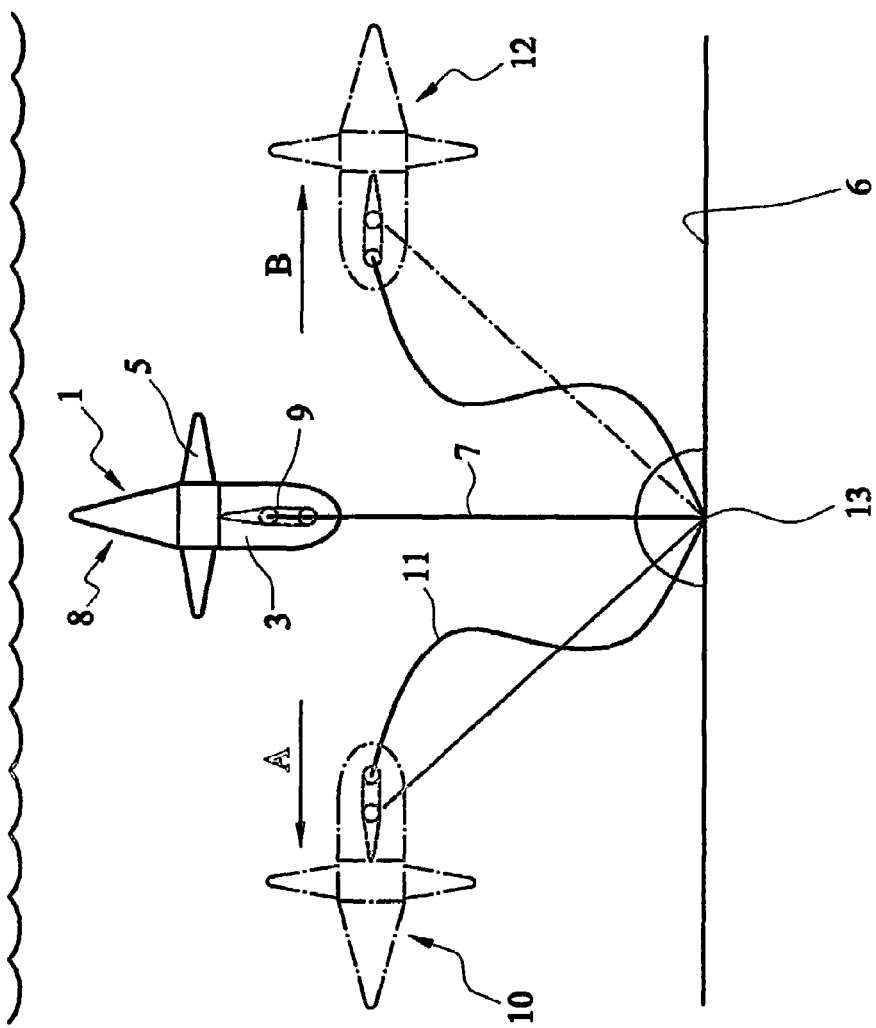
FIG. 1 is a sideways view of an apparatus for generating electrical power of a first embodiment of the present invention, in which the apparatus is shown in three orientations relative to a mooring.

Referring to FIGS. 1 and 2, an undersea power generation apparatus 1 comprises two turbines 3 mounted side by side at either side of a support strut 4 of hydrofoil-shaped cross section. Each turbine 3 has a set of turbine blades 5, which in the embodiment shown in FIG. 2 counter rotate so as to cancel out the respective torque produced by each turbine. The apparatus 1 is pivotally interconnected at point 9 to a pair of mooring cables 7, which are moored to the seabed 6.

The turbines 3 are positively buoyant such that in zero current they point vertically upwards as denoted by 8. When the current flows in the direction shown by arrow A, the drag forces on turbines 3 and support strut 4 cause the power generation apparatus 1 to pivot about pivot point 9 and pitch over into the condition denoted by 10 and shown in broken lines.

In this position the force of water flowing past the turbines 3 causes the turbine blades 5 to rotate and thus produce electricity in an electrical generator (not shown). This electrical energy is removed from the turbines 3 by a cable 11.

When the tide begins to change direction, the magnitude of the water current flowing past the turbine assembly 1 decreases. Accordingly, the turbine assembly 1 will tend to float back into the vertical condition shown by 8. Eventually, due to the effect of the tide, water will begin to flow in the direction shown by arrow B, and the apparatus 1 will pitch over into the position denoted by 12 and shown in broken lines.

In this way, it can be seen that the turbine assembly I changes direction to align itself with the current by rotating in a generally vertical plane about an axis through point 13, the point at which the mooring cable is moored to the seabed. The turbine assembly 1 is prevented from rotating about a vertical axis, as a result if which the mooring cables 7 are prevented from tracing out a conical surface, by virtue of there being two mooring cables 7 and the fact that these cables are always taut due to the buoyancy of the turbine assembly 1. This therefore minimises twisting of any cables such as mooring cables 7 or cable 11.

Figure 4:
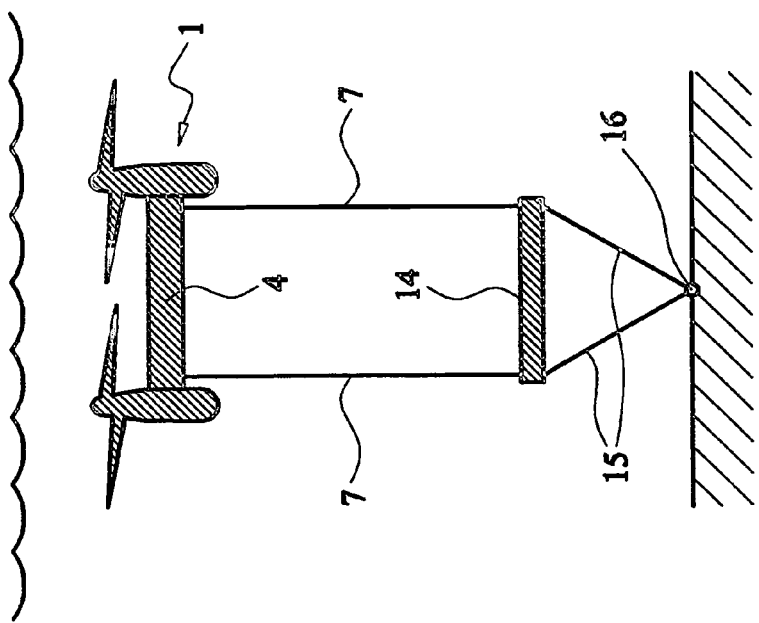
FIG. 4 is a front view of the apparatus of FIG. 3.
Figure 3:
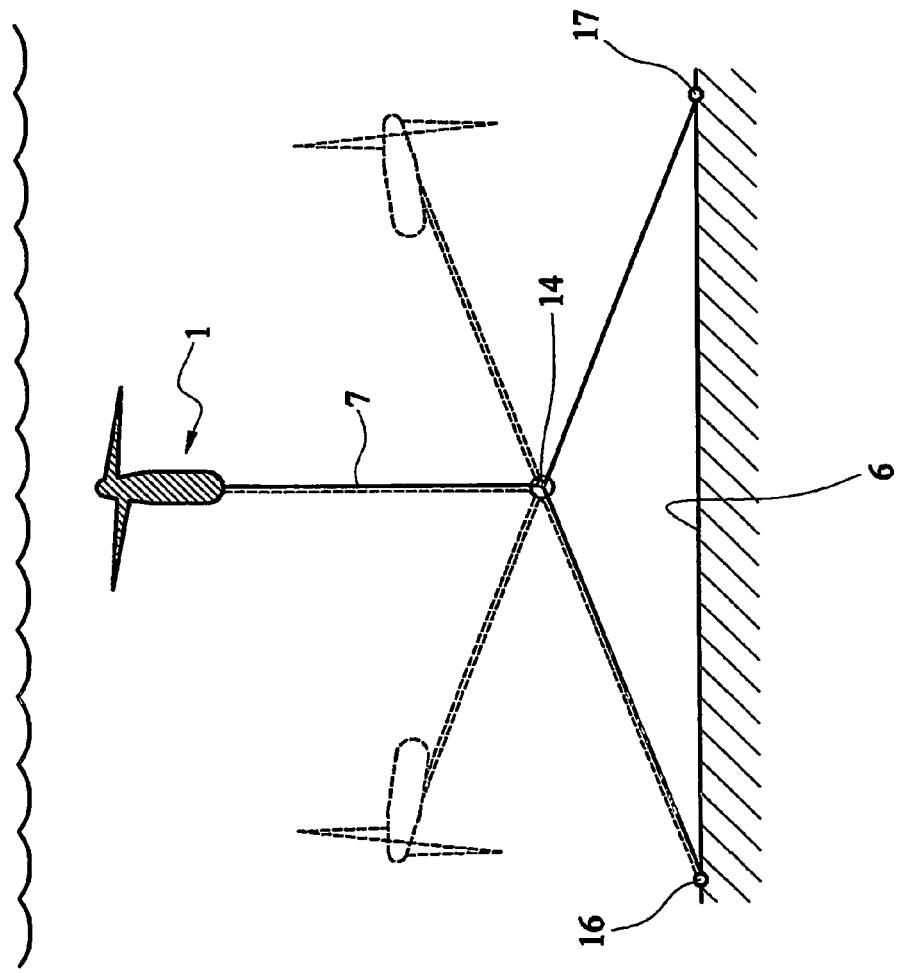
FIG. 3 is a side view of an apparatus of a second embodiment of the invention.

Referring to FIGS. 3 and 4, a second embodiment of the power generation apparatus 1 is shown. In this embodiment the mooring cables 7 are separated by a spacer bar 14, and four further cables 15 (two of which can be seen in FIG. 4) arranged in two V-shaped configurations moor the spacer bar to the seabed at points 16 and 17. As a result of this, the apparatus 1 pivots about spacer bar 14 in order to follow the flow of water current. In this respect, the apparatus 1 behaves in a similar manner to the apparatus of FIGS. 1 and 2.

Figure 5A:
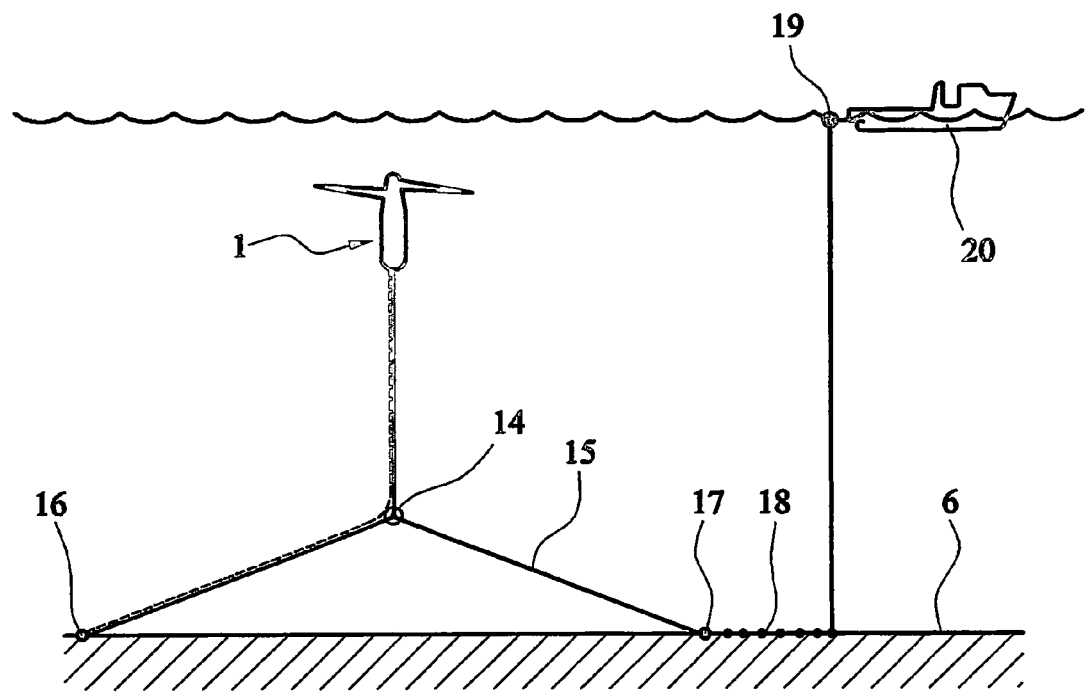
Figure 5B:
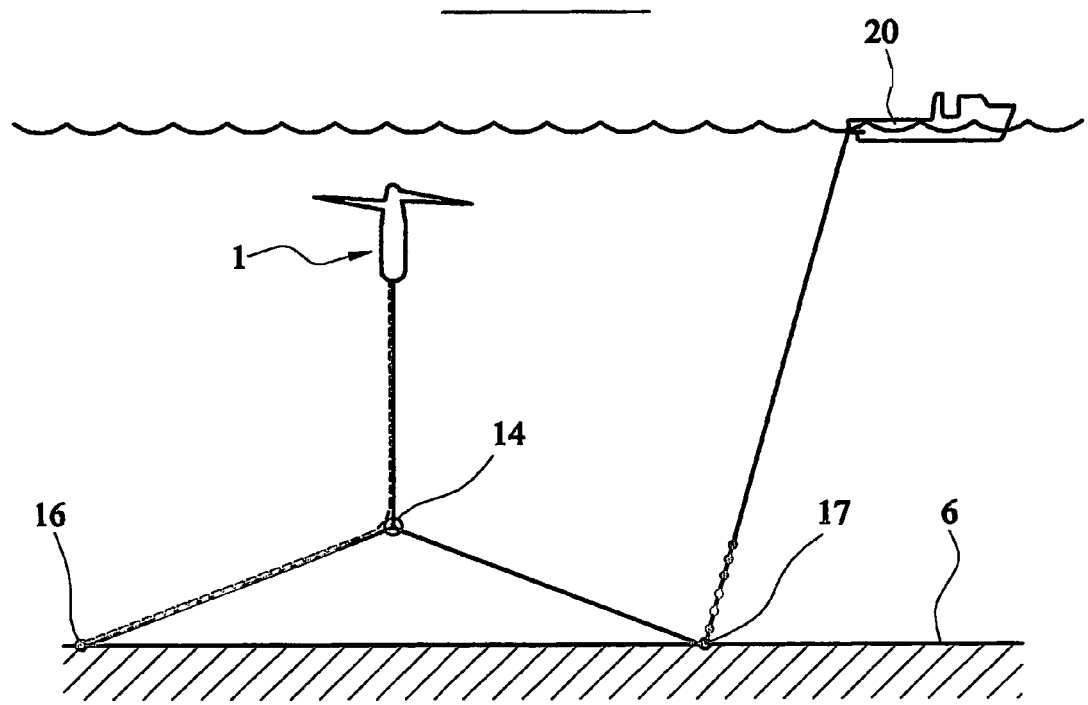

With reference to FIGS. 5a, 5b and 5c a maintenance process for the power generation apparatus 1 will now be described.

Spacer bar 14 is moored to the seabed 6 at anchor points 16 and 17. One of the mooring cables, in this case the one anchored to the seabed at anchor point 17 is further connected to an extended portion of cable 18, which has one end affixed to mooring cables 15 and a second end connected to a buoy 19 floating on the surface of the sea.

In order to raise the turbine assembly 1 to the surface, a surface vessel 20 must retrieve buoy 19 and connect cable 18 to a winch (not shown). Anchor point 17 is equipped with release means which enables cable 18 to be fed through anchor point 17 such that the turbine assembly 1 is able to float to the surface of the sea. The vertical rate of ascent of the generator assembly 1 controlled, by a winch (not shown) on board surface vessel 20. The release of the anchor mechanism (not shown) at 17 (which may be a ball grab or equivalent system) is achieved by means of a remotely operated vehicle, wireline or other such system as will be familiar to persons skilled in the art. When the turbine assembly 1 is on the surface of the water, any suitable repairs or maintenance may be performed.

In order to return the turbine assembly 1 to its operational position under the water, the winch (not shown) on board surface vessel 20 is reversed and the turbine assembly 1 is pulled back into position. The anchor mechanism (not shown) at anchor point 17 is then reactivated thus securing the mooring cables 15 to the sea bed.

It will be appreciated by persons skilled in the art that the above embodiments have been described by way of example only and not in any limitative sense, and that various alterations and modifications are possible without departure from the scope of the invention as defined by the appended claims. In particular, the embodiments described above feature two turbines placed side by side such that the counter-rotation of the turbine blades cancels out the effect or torque produced by the turbines. If the mooring assembly were formed from a rigid structure, the rigid mooring assembly could be designed to be strong enough to counteract the torque producing effect of the turbine such that only a single turbine is used in the power generation apparatus.

The invention claimed is:

1. An apparatus for generating electrical power from water flow, the apparatus comprising:
    at least one positively buoyant turbine comprising a respective first part and a respective second part adapted to be rotated about a respective axis by means of water flow relative to said first part, wherein the centre of mass and the centre of buoyancy of the or each said turbine are spaced apart from each other such that the axis of the or each said turbine adopts a substantially vertical orientation in non-flowing water;
    and at least one mooring cable for mooring the or each said turbine in a submerged condition to the floor of a body of water, at least one said mooring cable adapted to be releasably secured to said floor at an anchor point to retain said turbine below the surface of the water, at least one said mooring cable further comprising an extended portion connected to a buoy arranged to float on the surface of the body of water, the extended portion arranged to extend between the anchor point and the buoy to enable the at least one said mooring cable to be released from said floor to allow the turbine to float to said surface.

2. An apparatus according to claim 1, wherein at least one said turbine is connected by means of a plurality of said mooring cables to the floor of the body of water.

3. An apparatus according to claim 2, further comprising at least one spacer member separating a pair of said mooring cables.

4. An apparatus according to claim 1, wherein a plurality of said turbines are rigidly connected to each other.

5. An apparatus according to claim 4, wherein the second parts of at least one pair of said interconnected turbines are adapted to rotate in opposite senses to each other.

6. An apparatus according to claim 1, wherein at least one said turbine further comprises an electrical generator.

7. An apparatus according to claim 6, further comprising at least one electrical cable connected to a said turbine and adapted to remove generated electricity to a location remote from said turbine.

8. An apparatus according to claim 1, wherein at least one said mooring cable is rigid.

9. A method of retrieving an apparatus according to claim 1, the method comprising:
    retrieving said buoy;
    releasing at least one said mooring cable from said floor to allow the turbine to float to said surface;
    retracting said mooring cable to submerge the turbine; and
    attaching said mooring cable to said floor to retain the turbine in a submerged condition.

10. An apparatus for generating electrical power from water flow, the apparatus comprising:
    at least one positively buoyant turbine comprising a respective first part and a respective second part adapted to be rotated about a respective axis by means of water flow relative to said first part, wherein the centre of mass and the centre of buoyancy of the or each said turbine are spaced apart from each other such that the axis of the or each said turbine adopts a substantially vertical orientation in non-flowing water;

at least one mooring cable for mooring the or each said turbine in a submerged condition to the floor of a body of water; and at least one anchor point comprising release means to enable at least one said mooring cable to be releasably secured to said floor to retain the or each said turbine below the surface of the water, and to be released from said floor to allow the or each said turbine to float to said surface.

11. An apparatus according to claim 10, wherein at least one said turbine is connected by means of a plurality of said mooring cables to the floor of the body of water.

12. An apparatus according to claim 11, further comprising at least one spacer member separating two of said plurality of mooring cables.

13. An apparatus according to claim 10, wherein a plurality of said turbines are rigidly connected to each other.

14. An apparatus according to claim 13, wherein the second parts of at least one pair of said interconnected turbines are adapted to rotate in opposite senses to each other.

15. An apparatus according to claim 10, wherein at least one said turbine further comprises an electrical generator.

16. An apparatus according to claim 15, further comprising at least one electrical cable connected to a said turbine and adapted to remove generated electricity to a location remote from said turbine.

17. An apparatus according to claim 10, wherein at least one said mooring cable is rigid.

18. An apparatus according to claim 10, wherein at least one said mooring cable is connected to a buoy adapted to float on said surface when said mooring cable is attached to said floor.

19. A method of retrieving an apparatus according to claim 10, the method comprising:

actuating the release means to release at least one said mooring cable from said floor to allow the or each said turbine to float to the surface;

retracting said mooring cable to submerge the or each said turbine; and attaching said mooring cable to said floor to retain the or each said turbine in a submerged condition.

* * * * *